(12) United States Patent
Lovett

(10) Patent No.: US 7,757,428 B2
(45) Date of Patent: Jul. 20, 2010

(54) PNEUMATIC ACTIVATED DEVICE FOR RODENT CONTROL

(75) Inventor: Robert Lovett, 140 Sherry Lynn Dr., Finger, TN (US) 38334

(73) Assignee: Robert Lovett, Finger, TN (US)

( * ) Notice: Subject to any disclaimer, the term of this patent is extended or adjusted under 35 U.S.C. 154(b) by 114 days.

(21) Appl. No.: 12/077,607

(22) Filed: Mar. 21, 2008

(65) Prior Publication Data

US 2008/0236026 A1   Oct. 2, 2008

Related U.S. Application Data

(60) Provisional application No. 60/920,126, filed on Mar. 27, 2007.

(51) Int. Cl.
*A01M 23/36* (2006.01)

(52) U.S. Cl. .................... 43/78; 43/77; 43/6
(58) Field of Classification Search ............ 43/78, 43/77, 6, 4, 75, 79
See application file for complete search history.

(56) References Cited

U.S. PATENT DOCUMENTS

| 2,970,399 | A | * | 2/1961 | Frohlich et al. | 43/6 |
| 3,888,033 | A | * | 6/1975 | Fima | 43/6 |
| 4,494,335 | A | * | 1/1985 | Gaines | 43/80 |
| 4,539,774 | A | * | 9/1985 | Hamilton | 43/80 |
| 4,596,087 | A | * | 6/1986 | Pratscher | 43/64 |
| 4,653,221 | A | * | 3/1987 | Pratscher | 43/64 |
| 4,858,373 | A | * | 8/1989 | Combs | 43/61 |

\* cited by examiner

*Primary Examiner*—Christopher P Ellis

(57) ABSTRACT

A mechanical device with automatic reset capabilities that injects compressed air or other gases into the heart and lung cavities of Order Rodentia pest which results in death by delayed air embolism or cardiac arrest. This method allows the target time to vacate the premise saving time on carcass removal and clean up. This new technology can replace the poison bait traps and other environmental pollutants currently in use.

4 Claims, 5 Drawing Sheets

PNEUMATIC ACTIVATED DEVICE FOR RODENT CONTROL

RELATED APPLICATIONS

This application claims the benefit under 35 USC 119(e) of prior Provisional Application 60/920,126, "Rodent Trap," filed Mar. 27, 2007, by Robert Lovett, which is incorporated herein by reference in its entirety.

FIELD OF THE INVENTION

This invention relates to pest and rodent control, and more particularly to the delayed termination of pest and rodents.

BACKGROUND OF THE INVENTION

There have been many attempts to control rats and mice using capture and kill methods.

These efforts include spring loaded traps, actuating-current (AC) and direct-current (DC) operated electrocution devices, poison and glue bait traps. Kill and capture traps are labor intensive because of reset and carcass removal and not suited for large population extermination. Poisons have been banned in many parts of the world because of leakage into streams, rivers and lakes. Dichloro-Diphenyl-Trichloroethane (DDT) stands as dire testimony to the effects of poisons that almost decimated the United States Golden Eagle population.

SUMMARY OF THE INVENTION

The present invention provides an automated reset device, in which the pest or rodent is injected with compressed air into the chest cavity such as the lungs and heart which results in death by delayed air embolism or cardiac arrest.

This method allows the target to vacate the device location before expiring. This is the preferred method since it requires no carcass removal after each activation.

It is thus an object of the present invention to provide a delay kill rodent device that cannot be easily circumvented.

It is a further object of the present invention to provide a low cost system that is easy to manufacture in large numbers.

It is a further object of the present invention to provide a rodent kill device that can easily be deployed with low cost field maintenance and recharging visits.

It is a further object of the present invention to provide a rodent kill device that is not harmful to humans, pets or livestock.

It is a further object of the present invention to provide a rodent kill device that does not pollute the environment with poisons or chemicals.

It is a further object of the present invention to provide a rodent kill device that does not poison or contaminate the upper or lower food chains with contaminated rodent carcass.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out in the following specification. The foregoing and other objects, features, and advantages of the invention are apparent from the following detailed description taken in conjunction with the accompanying drawings in which.

The detailed description explains the preferred embodiments of the invention, together with advantages and features, by way of example with reference to the drawings.

DETAILED DESCRIPTION OF THE INVENTION

Figure 1:
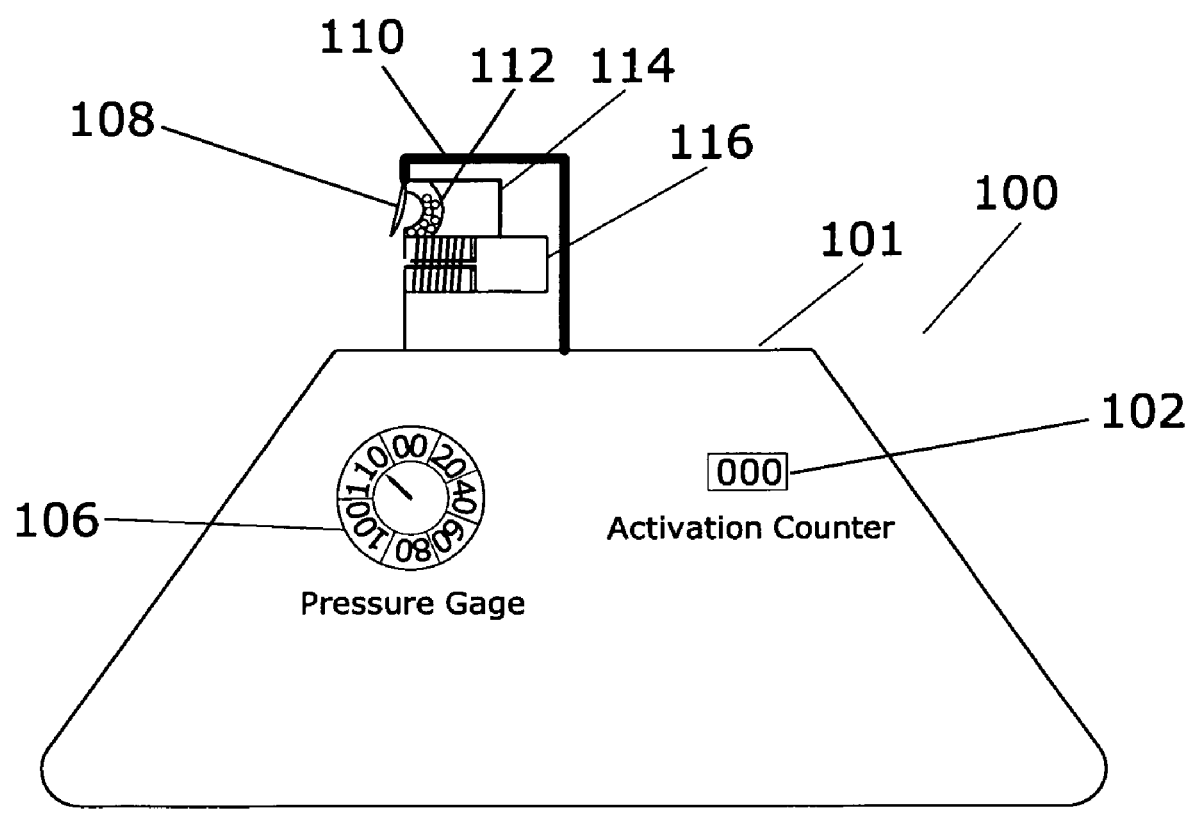
FIG. 1 shows an exemplary delayed kill device for rodents and other pests in accordance with the present invention.

FIG. 1 is a device diagram of a system using the present invention. The device 100 contains a compressed air tank 101, a status gage 102 which gives details about the number of activations by the cylinder 116, indicating when trap should be relocated. Also included is an air pressure gage 106 indicating when air compressed tank needs refilling. Item 108 is a spring loaded trigger that activates the cylinder 116 with high pressure air. Item 110 is a layout of the plumbing that carries the high pressure air to the cylinders spring loaded trigger 108. Item 112 is a bait tray which holds the food or other concoctions used to lure the rodent into the device. Item 114 is the high pressure air line that completes the circuit from the spring loaded trigger 108 to the cylinder 116 that injects the rodent with an open needle into the upper chest cavity causing air embolism.

Figure 2:
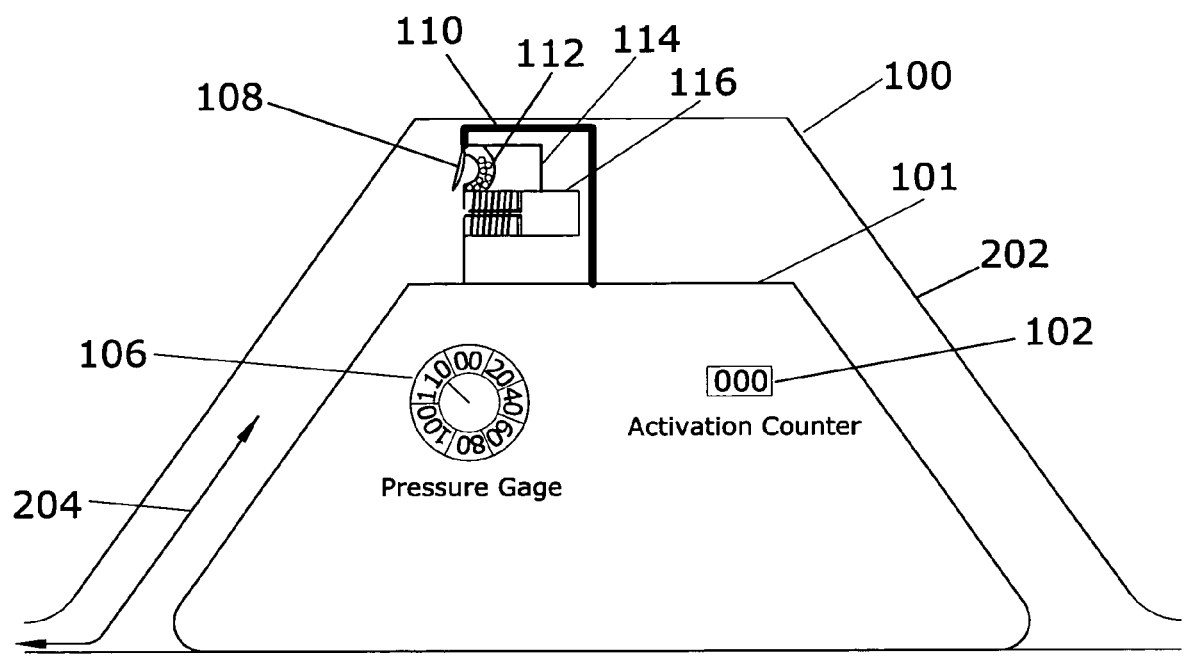
FIG. 2 shows an outer or protective cover installed that may be changed in size, color and configuration to target a specific order rodentia species of animals or pest.

FIG. 2 is a clear protective cover that protects humans, pets and livestock from injury.

Figure 3:
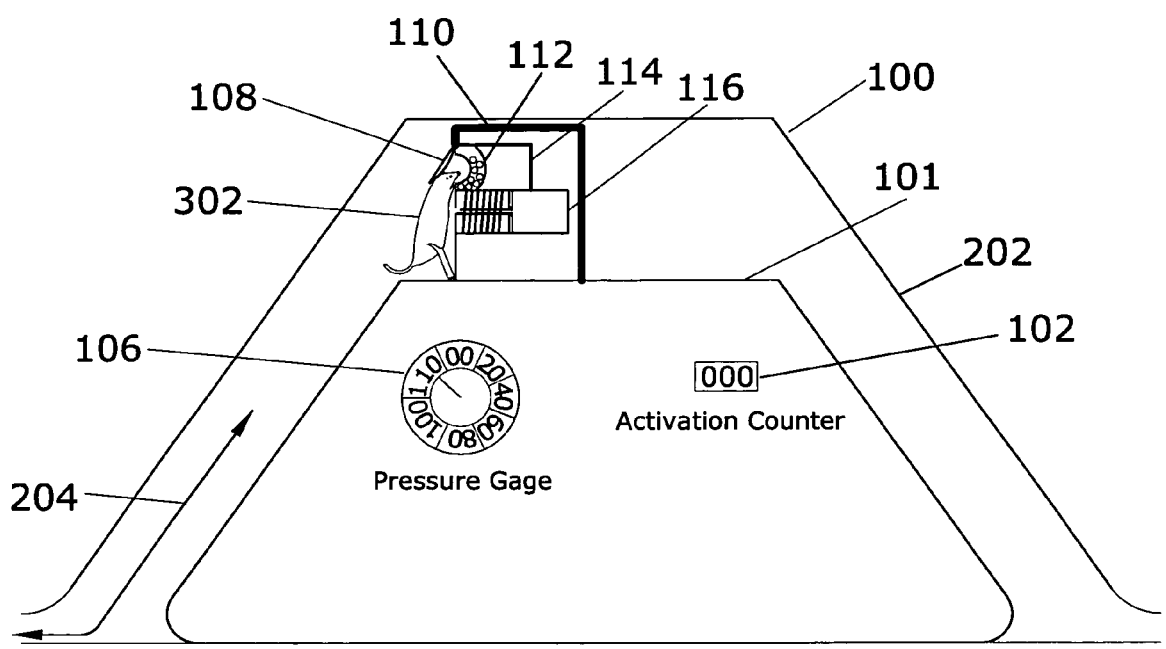
FIG. 3 shows a rodent looking for food at a bait tray.

As illustrated in FIG. 3, the rodent 302 enters the trap through a small protective tunnel 204 used to keep pets and children from entering. The rodent 302 opens the spring loaded bait tray trigger 108 which causes high pressure air to enter into the cylinder 116 by way of line 114 of FIG. 4

Figure 4:
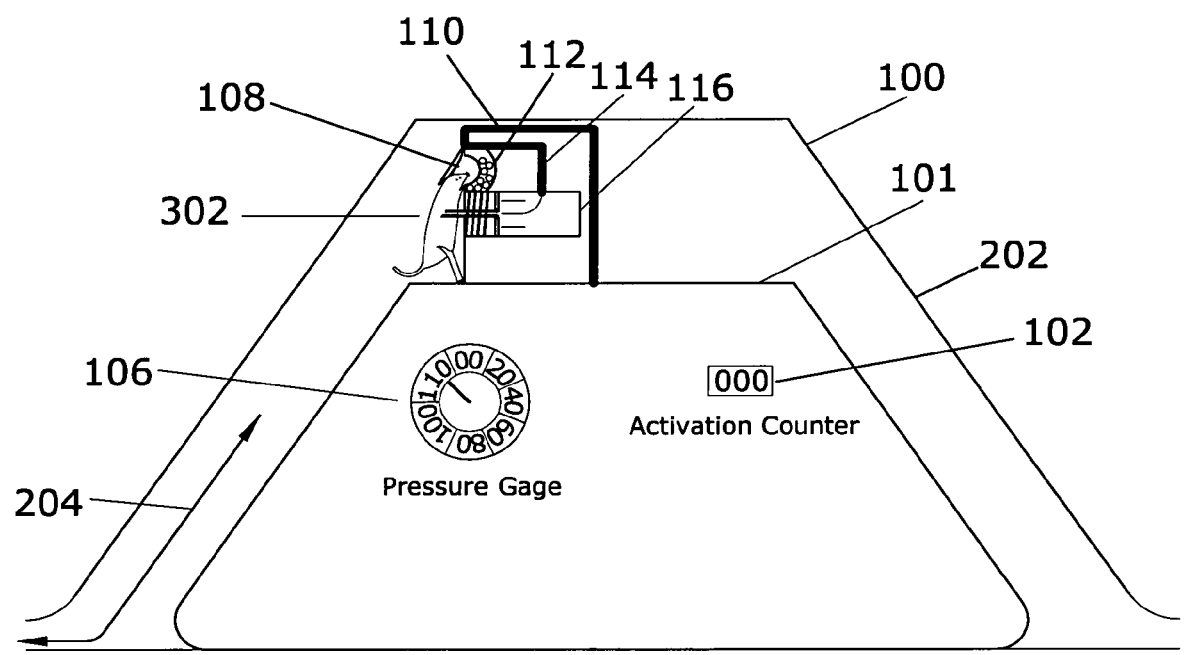
FIG. 4 shows a high pressure spring loaded air cylinder with hollow injection needles being activated.

FIG. 4 illustrates the cylinder 116 pushing out one or more needles each with a different length into the rodent 302 upper chest cavity. High pressure air is injected through the needles into the rodent 302 heart and lungs.

Figure 5:
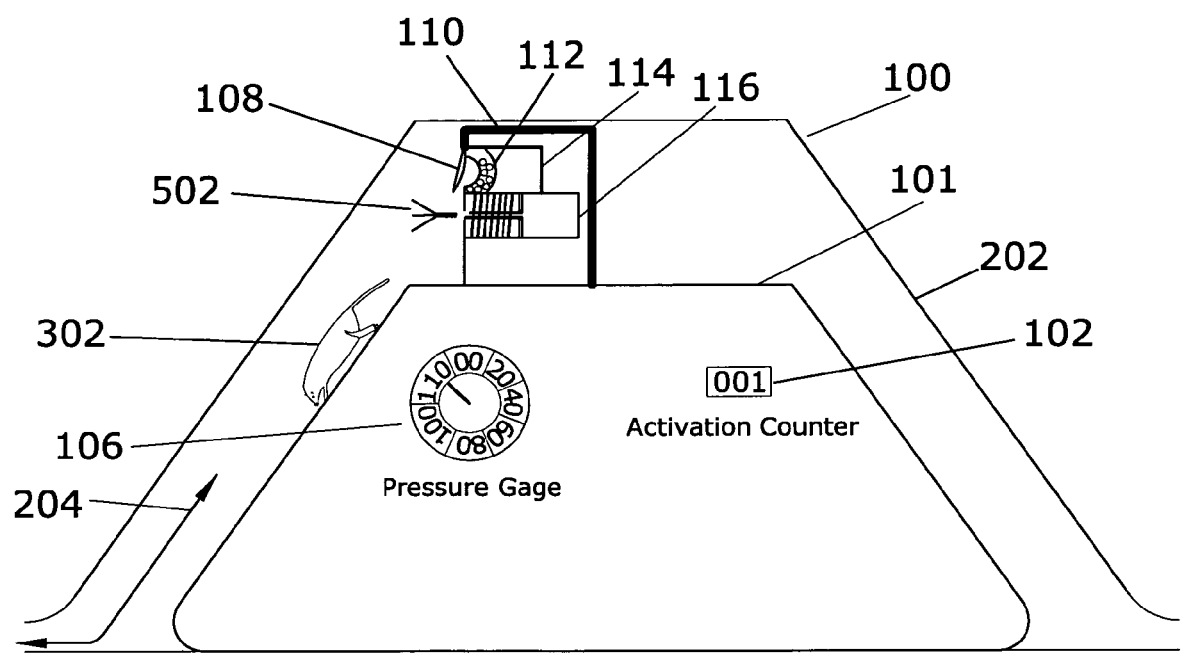
FIG. 5 shows the spring loaded high pressure cylinder being automatically reset after rodent vacates the trap vicinity.

FIG. 5 shows the startled rodent 302 leaving the trap through the tunnel 204 to find safety. The spring loaded trigger 108 now returns to its normal closed state cutting off the air supply to cylinder 116. The cylinder 116 now exhausts air 502 through the injection needles and resets to its normal spring loaded state and status gage 102 increments by one.

From the forgoing statement, summary and description in accordance with the present invention, it is understood that the same are not limited thereto, but are susceptible to various changes and modification as known to those skilled in the art and I therefore do not wish to be limited to the details shown and described herein, but intend to cover all such changes and modifications which would be encompassed by the scope of the enclosed documents.

The capabilities of the present invention may be implemented using a fuel cell, an air compressed cylinder, foot or hand pump or be connected to an existing air supply or some combination thereof.

The flow diagrams depicted herein are just examples. There may be many variations to these diagrams or the steps (or operations) described therein without departing from the spirit of the invention. For instance, the steps may be performed in a differing order, or steps may be added, deleted or modified. Rather than using compressed air or other non poisonous gasses, Organophosphates could be injected although there are many risk involved such as a ruptured tank that children and pets might come in contact with. All of these variations are considered a part of the claimed invention.

What is claimed is:

1. A pneumatic activated device for rodent control, comprising:
    a compressed air tank having:
    a connection means for connecting an air supply line to a spring loaded air cylinder;
    said air cylinder having a needle on one end with a hole through a center; and
    a bait tray comprising a spring loaded trigger that is activated by a rodent;
    said trigger opens a valve connecting said compressed air tank to said spring loaded cylinder causing said needle to penetrate a chest cavity of said rodent injecting compressed air that will induce an embolism;
    said whereby rodent flees said device causing said spring loaded trigger to close cutting off said air supply line from said compressed air tank and resetting said spring loaded cylinder.

2. The invention of claim 1, wherein said device further comprises a status gage that increments each time said trigger is activated.

3. The invention of claim 1, wherein said device further comprises a air pressure gauge displaying the remaining air supply in said air compressed tank.

4. The invention of claim 1, wherein said device further comprises a surrounding protective cover to prevent accidental activation of said trigger.

* * * * *